March 29, 1966  R. R. MOULTON ETAL  3,242,802
APPARATUS FOR HOLDING AND MOVING A STRIP FILM IN A PROJECTOR
Filed Aug. 7, 1964  2 Sheets-Sheet 1

ROGER R. MOULTON
LEONARD J. SEABERG
INVENTORS

BY R. Frank Smith
Paul P. Holmes
ATTORNEYS

March 29, 1966 R. R. MOULTON ETAL 3,242,802
APPARATUS FOR HOLDING AND MOVING A STRIP FILM IN A PROJECTOR
Filed Aug. 7, 1964 2 Sheets-Sheet 2

ROGER R. MOULTON
LEONARD J. SEABERG
INVENTORS

BY R. Frank Smith
Paul P. Holmes
ATTORNEYS

United States Patent Office 3,242,802
Patented Mar. 29, 1966

3,242,802
APPARATUS FOR HOLDING AND MOVING A STRIP FILM IN A PROJECTOR
Roger R. Moulton and Leonard J. Seaberg, Rochester, N.Y., assignors to Eastman Kodak Company, Rochester, N.Y., a corporation of New Jersey
Filed Aug. 7, 1964, Ser. No. 388,098
7 Claims. (Cl. 88—24)

This invention relates to a viewer for strip film, and more particularly to a projection viewer for locating a strip holder and the image bearing strip, which is slidably received in such holder, in a position from which the strip may be conveniently moved by the viewer mechanism in image scanning relation to the optical projection system for viewing purposes.

The use of microfilm in short-strip form for information storage and retrieval is becoming increasingly popular. Understandably, this popularity is in part based upon the concept flexibility of short strip films and has stimulated the development of new film viewers, or readers as they are referred to in the art, providing convenient access to the recorded information on the strips. Short lengths of microfilm are conveniently stored during periods of non-use in individual strip storage holders. These holders are frequently formed of plastic material and are provided with a channel extending longitudinally of the holders for slidably receiving the film strips. Much of the projection apparatus which has been available to the trade is not well adapted for receiving the individual strip holders and cannot, without substantial modification, be adapted for viewing the images on the strips contained within such holders. It frequently occurs that the operator of a projection apparatus, which is capable of viewing images on strips contained in strip holders, forgets to return the image bearing strip to the strip holder prior to removing the strip holder from the projection apparatus. One possible result of this oversight is damage to and/or loss of the image bearing strip. The viewer of the present invention provides a convenient and reliable means for viewing images on image bearing strips slidably received in individual strip holders. As one of its aspects, the projection viewer of the present invention comprises means for locating a strip holder in a fixed position relative to the optical projection system from which position the strip within such holder can be slidably moved from the holder in scanning relation to the optical projection system. Another aspect comprises means for locking the strip holder in the projection viewer to prevent removal of the strip holder whenever any portion of the strip remains outside of the strip holder. One object of the present invention is, therefore, to provide an improved viewer for image bearing strips.

Another obect of the present invention is to provide an improved apparatus for viewing images carried on image bearing strips slidably received in strip holders.

Another object of the present invention is to provide a projection viewer for image bearing strips in strip holders and including an interlock which prevents removal of the strip holder from the apparatus whenever the strip is not fully returned into the holder.

Still another object of the present invention is to provide a projection viewer with an arrangement for accurately locating a strip holder containing a slidable image bearing strip so that the holder is aligned with the optical projection system and the strip in such holder is disposed for engagement with the strip moving mechanism of the viewer.

Yet another object of the present invention is to provide a projection viewer for receiving and precisely locating a strip holder containing an image bearing strip so that the strip is positioned for movement by the strip moving mechanism of the viewer from the holder in image scanning relation to the optical projection system and having an interlock which prevents removal of the holder from the apparatus whenever any portion of the strip remains outside the holder.

Still other objects and advantages of the present invention will become readily apparent to those skilled in the art from the following description with reference to the drawings in which like characters denote like parts and wherein.

Figure 1:
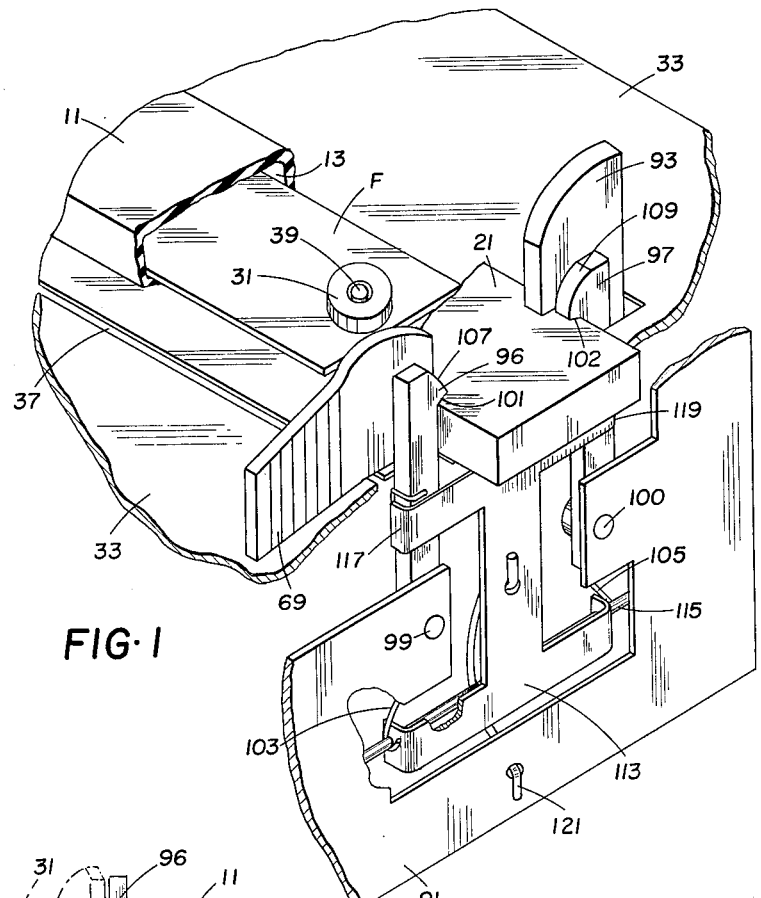
FIG. 1 is a picture view, partially broken away, showing some of the structural features of the projection viewer of the present invention.

In the figures of the drawings the numeral 11 designates a strip storage holder and the character F designates the image bearing strip, usually a strip of microfilm, which is slidably carried by holder 11. The strip holder 11 has a strip receiving channel 13 which is open on one end of the holder and runs longitudinally of the holder. The channel is of a width and depth such that the strip F can be slidably moved and releasably retained therein. The undersurface of the holder 11 is provided with an opening 15 which runs longitudinally of the holder and extends from the upper end 17 of the holder for a distance approximately equal to the length of the strip F which is received therein. A pair of spaced detents 19 (only one of which is visible in FIG. 2) extend into the channel 13 from the inner top surface of the channel. The lower end 21 of holder 11 has two notches 23 and 25 which extend through the thickness of the holder and serve an important positioning function, as will be hereinafter more fully described.

The strip F has an eyelet 31 mounted in the lower end of the strip. The function of the eyelet is twofold. Firstly, it provides an excellent bearing surface for the strip moving mechanism of the projection viewer and secondly it serves to releasably hold the strip F within holder 11 as the result of the interfering engagement of the eyelet with the detents 19. The detents are sufficiently large that the strip must flex in order for the eyelet 31 to pass over the detents, and in this way the strip is releasably retained within the strip holder. The distance between the detents and the end of channel 13, against which the end of strip F abuts when fully returned to the holder, is such that the eyelet has passed over but is retained by the detents when the end of the strip is in abutting engagement with the end of the channel. See the phantom position of strip F shown in FIG. 2.

The numeral 33 designates the base of the projection viewer. Base 33 has two parallel slots one of which, the pin slot 35, is covered by the holder 11 when positioned on the base and the other, a knob slot 37, the purpose of which will be hereinafter set forth.

Figure 2:
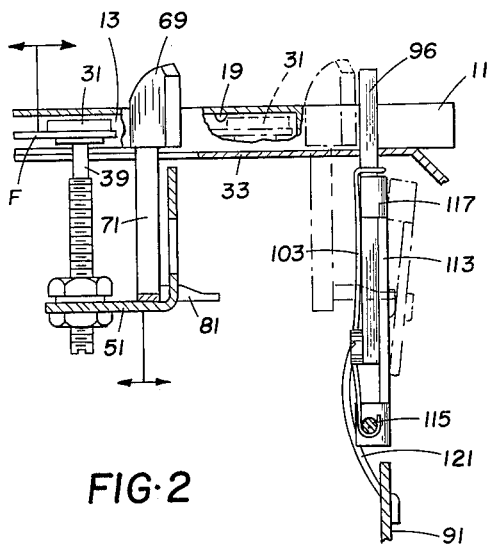
FIG. 2 is an elevation view further showing the invention illustrated in FIG. 1.
Figure 3:
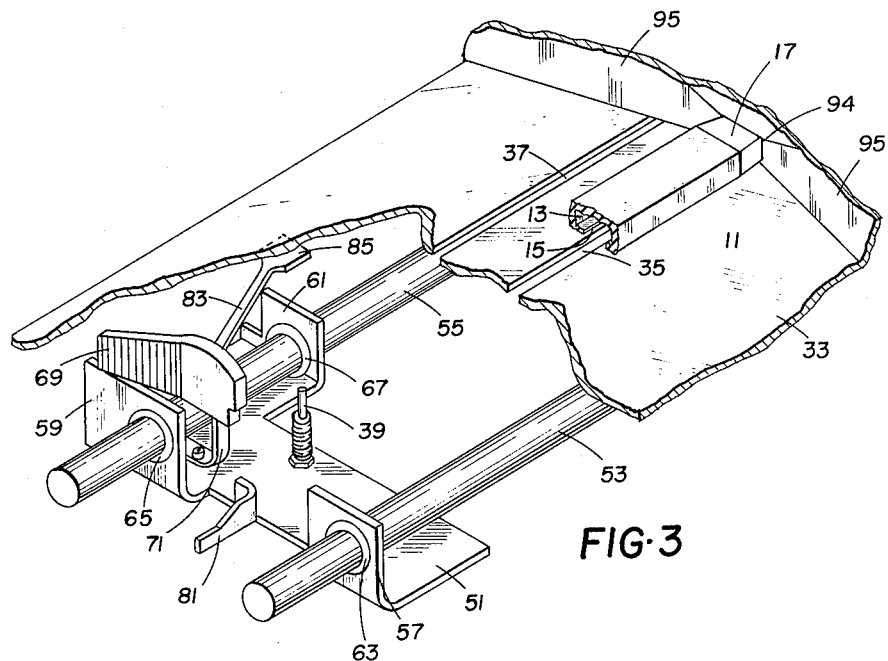
FIG. 3 is a picture view, partially broken away, further showing the projection viewer of the present invention.

The mechanism of the projection viewer by means of which strip F is moved in scanning relation to the optical system, is perhaps best illustrated in FIG. 3. Pin 39 is mounted in a conventional manner on the transport platform 51. Platform 51 is mounted for movement relative to parallel rods 53 and 55 which are supported in fixed relation to the frame of the projection viewer by conventional means (not shown). Platform 51 is formed with a flange 57 on one side and a pair of flanges 59 and 61 on the other side. Bushing 63 is mounted in flange 57 and facilitates sliding movement of the platform relative to rod 53. In the same way bushings 65 and 67 are provided in flanges 59 and 61 respectively and facilitate sliding movement of platform 51 relative to rod 55. The three point support of platform 51 on rods 53 and 55 maintains the platform correctly oriented for movement along the rods. Transport knob 69 is connected to and supported on platform 51 by means of a bracket 71. The bracket 71 is sufficiently long to support knob 69 above the surface of base 33 adjacent to strip holder 11 and is, of course, freely movable in knob slot 37, see FIG. 2. This enables an operator to manually move the transport platform 51 relative to rods 53 and 55 by merely pushing or pulling on knob 69. The transport platform 51 has a release 81 which extends substantially parallel to rods 53 and 55, and for purposes of convenience, is located half-way between the rods. The numeral 83 designates a friction spring which is carried by the platform 51 and has a flat friction surface 85 which is resiliently supported in engagement with the undersurface of base 33. The purpose of spring 83 is to reduce the possibility of accidental displacement of platform 51 relative to base 33 during operation of the projection viewer. In other words, a positive displacement effort is required in order to move the platform, and the strip F which is moved with the platform.

In FIG. 1 a portion of the frame 91 of the projection viewer is broken away as are portions of base 33 and strip holder 11 in order to better illustrate the structural features of the present invention. The numeral 93 designates a locating lug which is fixed in position on base 33 and which together with the knob 69 serves to locate the holder 11 on the base so that pin 39 will properly engage eyelet 31 in strip F when the holder is placed on base 33. The lug 93 and knob 69, when the latter is in its lowermost position directly opposite the locating lug, are of a thickness such that the notches 23 and 25 in holder 11 upon engaging the lug and knob accurately locate end 21 of the holder on base member 33. The upper end 17 of holder 11 is tapered to fit into a funnel shaped opening 94 which is formed in section 95 attached to the base 33. This cooperating structure serves to locate the end 17 of holder 11 relative to the projection optics of the reader so that the strip F, when moved from the holder by pin 39, will move in scanning relation to the projection optics as will be hereinafter described.

Numerals 96 and 97 designate two locking lugs which are pivotly mounted on frame 91 about pivot shafts 99 and 100 respectively. The locking lugs extend up through openings formed in base 33 a distance sufficient to enable the detents 101 and 102 on the lugs to overlie and engage the upper surface of the holder. The holder overlying surfaces of the detents 101 and 102 are inclined slightly relative to the plane of holder 11 so that a lifting movement of the holder will result in the lugs 96 and 97 being cammed about pivot shafts 99 and 100 respectively, away from the holder thereby permitting the holder to be removed from the projection viewer. A lug spring is associated with each lug. Spring 103 is fixed on one end to the frame 91 winds around pivot shaft 99 and is seated against the portion of lug 96 just below the base 33 and is tensioned to pivot lug 96 clockwise about pivot shaft 99, as viewed in FIG. 1. Spring 105 is associated with the lug 97 in substantially the same way that spring 103 is associated with lug 96. The result is that lug 97 is resiliently urged in a counter-clockwise direction about pivot shaft 100. When a holder 11 is not located on base 33 between the locking lugs 96 and 97, the portion of base 33, which defines the opening through which the lugs extend, forms a stop for the lugs, preventing the lugs from pivoting so far that they would block the insertion of a strip holder in the projection reader. The rounded top surfaces 107 and 109 on lugs 96 and 97 respectively cam the lugs open upon engagement with holder 11 during insertion of the holder on base 33.

The numeral 113 designates an interlock arm. Arm 113 is mounted on rod 115 for pivotal movement with respect to frame 91. Rod 115 is supported in brackets, not shown, which in turn are fixed to the frame 91. The upper end of the interlock arm 113 has a pair of flanges forming tabs 117 and 119 which are spaced apart a distance sufficient to engage and thereby restrict the previously referred to camming movement of lugs 96 and 97. The tabs 117 and 119 engage the lugs below the undersurface of base 33, see FIGURE 2. An interlock arm spring 121 is fixed on one end to frame 91 and on the other end to the interlock arm 113, and is tensioned to resiliently urge the interlock arm about rod 115 toward lugs 96 and 97. The release 81 extends from transport platform 51 a sufficient distance in the direction of frame 91 that when transport rod 69 is in its lowermost position opposite locating lug 93, the interlock arm 113 is pivoted against the force of spring 121 about rod 115 to the position indicated in phantom in FIG. 2. In that position tabs 117 and 119 are completely disengaged from locking lugs 96 and 97 respectively.

Figure 4:
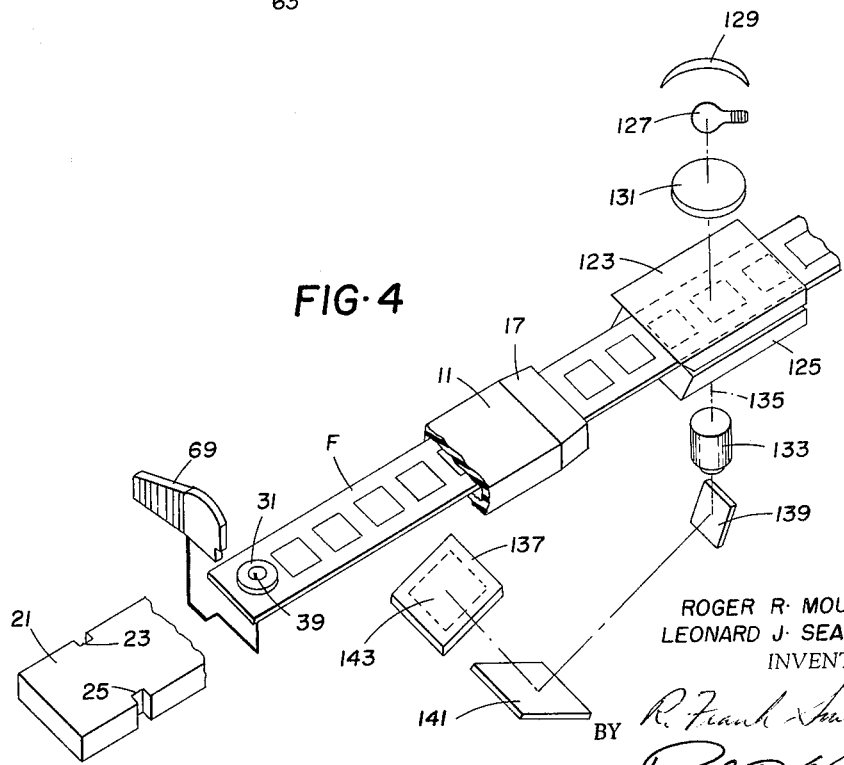
FIG. 4 is a schematic view of the projection viewer.

The operation of the projection viewer of the present invention will probably be best understood if the disclosure of FIG. 4 is considered along with that of FIGS. 1 through 3. FIGURE 4, which is somewhat schematic in form, shows a strip holder 11 which has been positioned on base 33 by having first inserted end 17 of the holder in opening 94, aligned notches 23 and 25 with knob 69 and locating lug 93 and pressed the holder down between lugs 96 and 97 onto base 33. When so located on base 33, pin 39 is engaged in the opening of eyelet 31 in strip F. At this time it would be possible for an operator to raise holder 11 from base 33 because tabs 117 and 119 on interlock arm 113 are held out of engagement with locking lugs 96 and 97 by release 81.

Assuming one wishes to view an image carried on strip F, the next step would be to manually move transport knob 69 along slot 37 relative to base 33. As previously explained, this would result in eyelet 31 moving over detents 19 and strip F being slidably moved out of the upper end 17 of holder 11 because of the engagement of pin 39 in eyelet 31. As soon as interlock arm 113 is released by the movement of release 81 away from the arm 113, the arm pivots through the action of spring 121 into engagement with the locking lugs 96 and 97. Strip holder 11 is then locked in position on base 33 by the locking lugs 96 and 97. The projection viewer includes a pair of glass flats 123 and 125 which are aligned with strip F as it moves out of holder 11 and are spaced apart a distance sufficient to permit strip F to pass therebetween. The portion of the glass flats nearest to end 17 of holder 11 are beveled to form a guide for the leading edge of the strip F as it enters between the glass flats. The projection viewer of the present invention also includes a light source designated by numeral 127, a reflector 129, a condensing lens 131 and a projection lens 133, all of which are optically aligned along the optical axis 135 and form a portion of the optical projection system for the projection viewer. The plane between flats 123 and 125 in which the images on strip F are supported is the focal plane of the projection lens 133. The viewer also has a viewing screen 137 and one or more reflectors 139 and 141 disposed along the optical axis for directing the images projected by lens 133 onto the viewing screen as indicated at 143. Thus with the strip F moved to a position wherein a selected image on the strip is located in alignment with the optical axis and between glass flats 123 and 125 in the focal plane of the projection lens 133, the image is transilluminated and is projected by the projection system for viewing onto the viewing screen. The structural arrangement of the optical projection system, including the image directing reflectors and the viewing screen, is conventional and will not be described in detail herein.

Should the operator attempt to lift holder 11 from the base 33 while any portion of strip F extends outside end 17 of holder 11, e.g. between glass flats 123 and 125, lugs 96 and 97 prevent removal of the holder because of the engagement of tabs 117 and 119 of the interlock arm 113 with the lugs. Having viewed the desired image on strip F the operator returns the strip into the holder 11 by moving transport knob 69 to its lowermost position opposite locating lug 93. At that time release 81 has engaged and pivots interlock arm 113 away from locking lugs 96 and 97 permitting the same to cam away from the holder 11 against the bias of locking lug springs as the holder is raised at end 21 and removed from the base 33.

It will now be apparent to those skilled in the art that the projection viewer of the present invention is particularly useful in viewing images carried on an image bearing strip which is slidably received in a strip holder and incorporates novel means for accurately locating a selected strip holder in such a way that the image bearing strip within such holder is aligned with the optical projection system of the viewer, is disposed for engagement with the strip moving mechanism of the viewer, and is locked in position in the viewer unless and until the strip within the holder has been fully returned to the holder.

The invention has been described in considerable detail with particular reference to certain preferred embodiments thereof, but it will be understood that variations and modifications can be effected within the spirit and scope of the invention as described hereinabove, and as defined in the appended claims.

Having now particularly described our invention, what we desire to secure by Letters Patent of the United States and what we claim is:

1. Projection apparatus for viewing images on an image bearing strip slidably mounted in a strip holder upon movement of the strip from the holder into image projecting relation to an optical projection system; comprising
    (a) base means for locating and supporting said holder with the strip therein aligned for movement relative to said optical projection system;
    (b) means for engaging the strip in said holder and for moving the strip from the holder into image projecting relation to the optical projection system;
    (c) means engageable with said holder for locking the holder in position on said base means;
    (d) means for releasing said locking means when said holder is to be removed from said base means; and
    (e) means responsive to the displacement of the strip from within said holder by said engaging and moving means for rendering said releasing means inoperative;
    (f) whereby damage to the strip caused by the attempted removal of the holder from said base means prior to returning the strip into the holder is prevented.

2. Projection apparatus in accordance with claim 1 and wherein said locking means comprises:
    (a) a pair of locking lugs having portions which overlie said holder when located and supported by said base means; and
    (b) spring means for resiliently urging the lug portions into overlying engagement with said holder.

3. Projection apparatus in accordance with claim 2 and wherein:
    (a) said lugs are pivotally mounted in said apparatus for movement relative to said base means; and (b) said overlying portions comprise detents having holder engaging surfaces which are inclined relative to the surface of the holder, whereby said lugs are cammed out of engagement with the holder upon removal of the holder from said base means.

4. Projection apparatus in accordance with claim 2 and wherein:
    (a) said lugs are mounted in said apparatus for movement relative to said base means and said holder when located and supported on said base means; and
    (b) said releasing means comprises:
        (1) an interlock arm having locking lug engaging means and being mounted for movement between spaced first and second positions in said apparatus;
        (2) said lug engaging means being disposed in engagement with said lugs to prevent movement of the lugs when said arm is in said first position and being disengaged from said lugs when said arm is in said second position; and
        (3) said displacement responsive means is mounted for engaging and moving said interlock arm from said first to said second position.

5. Projection apparatus in accordance with claim 4 and wherein:
    (a) said interlock arm is pivotally mounted for movement between said first and second positions; and
    (b) said releasing means further comprises means for resiliently urging the interlock arm into said first position.

6. Projection apparatus in accordance with claim 1 and wherein said base means comprises:
    (a) a section which defines an opening of a size and configuration which accommodates and positions the end of said holder, from which the strip therein can be removed, so that said strip is aligned for movement relative to said optical projection system; and
    (b) a locating member which is disposed to engage said holder adjacent to the end thereof remote from said first mentioned end and as a result of such engagement locates the holder in a predetermined lateral and longitudinal relation to both said optical projection system and to said engaging and moving means on said base means.

7. Projection apparatus in accordance with claim 6 and wherein said base means further comprises:
    (a) knob means which is disposed to cooperate with said locating member in engaging and locating the holder in said predetermined relation; and
    (b) means operatively interconnecting said knob means and said moving means whereby said knob means serves the dual function of locating the holder and providing manual control for strip movement.

References Cited by the Examiner

UNITED STATES PATENTS 2,385,771 10/1945 Bogue.
3,161,105 12/1964 Offensend _____ 88—28

NORTON ANSHER, *Primary Examiner.*

V. A. SMITH, *Assistant Examiner.*